G. C. GRABLE.
VEHICLE WHEEL.
APPLICATION FILED OCT. 29, 1908.
926,650.
Patented June 29, 1909.
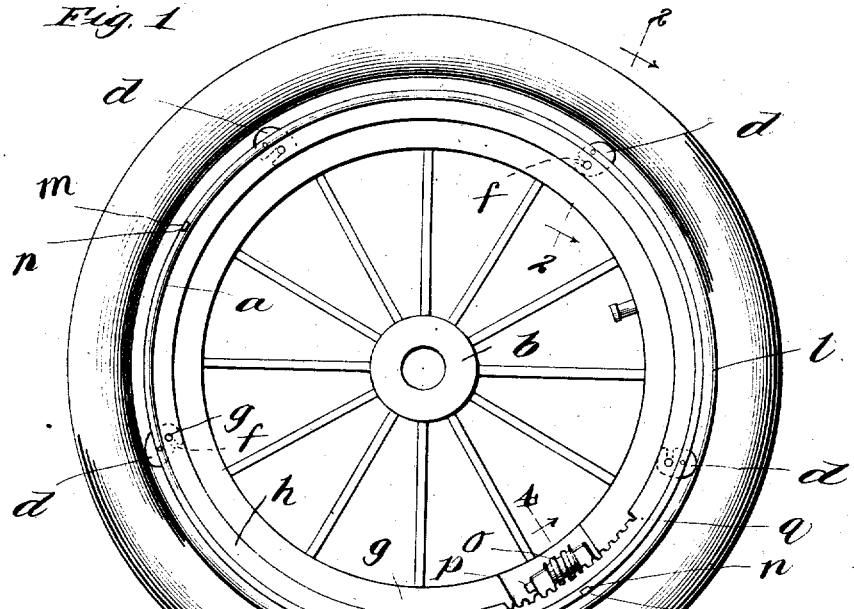
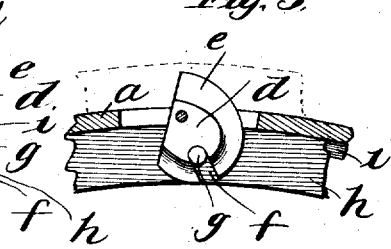
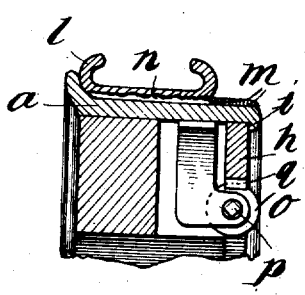
Witnesses.
Inventor.
Guy C. Grable,
By G. L. Cragg
Atty

UNITED STATES PATENT OFFICE.

GUY C. GRABLE, OF BERWYN, ILLINOIS, ASSIGNOR TO THE PERFECTION EMERGENCY TIRE COMPANY, OF CHICAGO, ILLINOIS, A CORPORATION OF ILLINOIS.

VEHICLE-WHEEL.

No. 926,650.

Specification of Letters Patent.

Patented June 29, 1909.

Application filed October 29, 1908. Serial No. 459,987.

*To all whom it may concern:*

Be it known that I, GUY C. GRABLE, citizen of the United States, residing at Berwyn, in the county of Cook and State of Illinois, have invented a certain new and useful Improvement in Vehicle-Wheels, of which the following is a full, clear, concise, and exact description, reference being had to the accompanying drawings, forming a part of this specification.

My invention relates to vehicle wheels having pneumatic tires and has for its object the provision of improved means whereby the pneumatic tire together with the demountable rim holding the same may be separably secured about a fixed wheel rim.

In one aspect, my invention may be generally described as comprising a wheel, a pneumatic tire carried upon a demountable rim, clamping or fastening devices distributed about the circumference of the fixed rim, and unitary mechanism common to said clamping devices, whereby, in one operation of the unitary mechanism, the clamping devices may be operated to secure the demountable rim about the fixed rim, and, in another operation, the clamping devices may be operated to release the fastening engagement between the demountable rim and the fixed rim.

In another aspect, my invention may be described as including a plurality of cams distributed about the fixed rim of the wheel, a common mounting therefor, and means for effecting simultaneous movement of the cams to bring said cams into and out of locking engagement with the demountable rim of the pneumatic tire for the purpose stated.

In the preferred embodiment of my invention, I employ a ring rotatable with respect to the fixed rim and in operative relation to the cams that are pivotally mounted upon the fixed rim, a movement of the ring in the plane of the felly serving to operate the cams, either to fasten the demountable rim in position or to release the tire structure, according to the direction of movement of the ring. I desirably associate with the ring, means for securing purchase thereupon to effect its movement in the plane of the wheel, which means desirably not only effects such movement of the ring, but also serves to secure the ring in the position that it is caused to assume when the cams are in locking relation with the demountable rim. To these ends, I interpose a ring-actuating device which has purchase upon a portion of the wheel structure, preferably the fixed rim, in engagement with the ring so that a movement of the actuating device will effect the desired movement of the ring with respect to the fixed rim and preferably also to secure the ring in the position that it has been caused to assume in order to lock the demountable rim in place. The ring thus constitutes a unitary actuating mechanism adapted to operate substantially simultaneously upon the fastening devices (the cams), this unitary actuating mechanism desirably including as a component part the mechanism that is interposed between the ring and the balance of the wheel structure, for the purpose of more readily securing the desired operation of the ring.

I will explain my invention more fully by reference to the accompanying drawing, showing the preferred embodiment thereof, in which—

Figure 1 is a face view of the wheel including the mechanism of my invention. Fig. 2 is a sectional view on line 2 2 of Fig. 1. Fig. 3 is a sectional view on line 3 3 of Fig. 2. Fig. 4 is a sectional view on line 4 4 of Fig. 1.

Like parts are indicated by similar characters of reference throughout the different figures.

The wheel to which I have shown the adaptation of my invention is one that may be used in automobiles, and it is in connection with automobiles that my invention finds a most important application.

The fixed rim $a$ of the wheel may be supported upon the hub $b$ in any preferred manner or may be otherwise rigidly related with the hub. Assuming that the body of the wheel is mainly of wooden construction, I desirably make the fixed rim partly of metal which metal part should preferably be permanently attached to the portion of the wheel structure surrounded thereby, said fixed rim preferably including in its construction an outwardly projecting flange $c$ along one peripheral edge thereof which acts as a rim structure-retaining flange, as will later appear. A number of spreading cams $d$ are distributed about and mounted upon the fixed rim, the mounting for the cams preferably being pivotal. The cams are desirably located near the peripheral edge of the fixed rim opposite to that edge where the flange $c$ is disposed, and, in the preferred embodiment of the invention, the fixed rim is provided with open spaces in which the cams are adapted to be worked, said cams having formations $e$ that act as does the flange $c$ in retaining the demountable rim from movement in the direction of the axis of the wheel, the portions $e$ therefore being in the nature of flanged projections upon said cams. The cams are provided with slots $f$ into which pins $g$ carried upon the actuating ring $h$, project. The ring $h$ is adapted to rotate in the plane of the wheel structure and is prevented from moving in the direction of the axis of the wheel by engagement with the vertical faces of the cams $d$ upon one side and an inturned lip $i$ formed upon the fixed rim $a$ upon the other side.

By means of the mechanism so far described, the movement of the ring $h$ in the plane of the wheel in one direction will rotate the cams $d$ simultaneously in directions similar to each other, and a reverse movement of the ring $h$ will effect movement of said cams simultaneously in reverse directions. When the ring $h$ is moved with sufficient force in one of these directions, it causes the cams $d$ to move or spread outwardly substantially simultaneously to engage and grip the demountable rim $l$, said cams being desirably of such a nature as not only to maintain the demountable rim concentric with the wheel, but also to prevent the demountable rim from creeping in the plane of the wheel. However, in order to guard against any tendency of the demountable rim to creep upon the wheel in the wheel plane, I desirably provide some suitable restraining agency which may be in the form of a number of notches $m$ in the fixed rim $a$ and a number of correspondingly spaced lugs, feathers or projections $n$ upon the demountable rim, which when the demountable rim is being located upon the fixed rim, are placed in register with the notches $m$, so that when the demountable rim is in position between the flange formations $c$ and $e$ the demountable rim is prevented from creeping. As an element of the common actuating device complemental to the element $h$ thereof, I desirably employ a worm screw $o$ provided with a suitable wrench-engaging surface $p$ and mounted upon the inner peripheral face of the fixed rim and having engagement with teeth $q$ provided upon the inner peripheral edge of the ring $h$, whereby a sufficient turning movement of the worm screw in one direction will cause the ring $h$ to move in the plane of the wheel in one direction and a reverse movement of the worm will occasion a reverse movement of said ring. The worm by its construction, serves to hold the ring in the position to which the worm has adjusted it.

The cams are desirably so related to the fixed rim that when they are drawn in, they preferably lie within the circumference of the portion of the fixed rim that directly underlies the demountable rim.

The form of pneumatic tire structure which I have shown is of well known construction, to which, however, I do not wish to be limited. It is held in a demountable rim $l$ that is rigid and preferably made of metal and which serves to retain the pneumatic inflatable and deflatable tire portion $s$, which may be of any suitable selected construction. The fastening devices (the cams) act in the plane of the wheel outwardly against the demountable rim to hold the demountable rim with respect to the fixed rim, reverse movement of the fastening devices freeing the demountable rim to permit its removal from the balance of the wheel structure.

It is not the object of my invention to provide means for securing the pneumatic portion of the tire to the rim thereof, but it is the object of my invention to provide the improvement described, whereby the pneumatic tire structure as a whole, including the demountable rim thereof, may be readily secured to or removed from the fixed rim of the wheel, to which end the demountable rim is a distinctly separate structure from the fixed rim.

While I have herein shown and particularly described the preferred embodiment of my invention, I do not wish to be limited to the precise construction shown, as changes may be made without departing from the spirit of the invention.

Having thus described my invention, I claim as new and desire to secure by Letters Patent the following:—

1. A wheel-structure including a demountable rim, a fixed rim a plurality of spreading cams distributed about and mounted upon the fixed rim and rotatable with respect to each other upon their mountings, and operating mechanism common to said cams adapted, in one operation to move the cams into engagement with the demountable rim, and, in another operation, adapted to operate said cams to disengage the same from the demountable rim, the fixed rim having a retaining flange and the cams having corresponding flanged portions, the demountable rim being adapted for disposition between the flanged portion upon the fixed rim and the flanged portions upon the cams which prevent the demountable rim from moving longitudinally of the axis of the wheel structure with respect to the wheel-structure, said cams when operated to fasten the demountable rim in position, moving outwardly from the center of the wheel structure to grip the demountable rim.

2. A wheel-structure including a demountable rim, a fixed rim a plurality of spreading cams distributed about the fixed rim and rotatable with respect to each other upon their mountings, and operating mechanism common to said cams adapted, in one operation, to move the cams into engagement with the demountable rim, and in another operation, adapted to operate said cams to disengage the same from the demountable rim, the fixed rim having a demountable rim retaining flange, and the cams having corresponding flanged portions, the demountable rim being adapted for disposition between the flanged portion upon the fixed rim and the flanged portions upon the cams which prevent the demountable rim from moving longitudinally of the axis of the wheel-structure with respect to the wheel-structure, said cams when operated to fasten the demountable rim in position, moving outwardly from the center of the wheel structure to grip the demountable rim.

3. A wheel structure including a demountable rim, a fixed rim a plurality of spreading cams distributed about and mounted upon the fixed rim and rotatable with respect to each other upon their mountings, and operating mechanism common to said cams adapted, in one operation, to move the cams into engagement with the demountable rim, and, in another operation, adapted to operate said cams to disengage the same from the demountable rim.

4. A wheel-structure including a demountable rim, a fixed rim a plurality of fastening devices distributed about and mounted upon the fixed rim and rotatable with respect to each other upon their mountings, and operating mechanism common to said fastening devices adapted, in one operation, to move the fastening devices into engagement with the demountable rim, and, in another operation, adapted to operate said fastening devices to disengage the same from the demountable rim.

5. A wheel-structure including a demountable rim, a fixed rim a plurality of fastening devices distributed about and mounted upon the fixed rim and movable with respect to each other and movable with respect to their mountings, and operating mechanism common to said fastening devices adapted, in one operation, to move the fastening devices into engagement with the demountable rim, and, in another operation, adapted to operate said fastening devices to disengage the same from the demountable rim.

6. A wheel-structure including a demountable rim, a fixed rim a plurality of spreading cams distributed about the fixed rim and rotatable with respect to each other upon their mountings, and operating mechanism common to said cams adapted in one operation to move the cams into engagement with the demountable rim, and, in another operation adapted to operate said fastening cams to disengage the same from the demountable rim.

7. A wheel-structure including a demountable rim, a fixed rim a plurality of fastening devices distributed about the fixed rim and rotatable with respect to each other upon their mountings, and operating mechanism common to said fastening devices. adapted, in one operation, to move the fastening devices into engagement with the demountable rim, and, in another operation, adapted to operate said fastening devices to disengage the same from the demountable rim.

8. A wheel-structure including a demountable rim, a fixed rim a plurality of fastening devices distributed about the fixed rim and movable with respect to each other and movable with respect to their mountings, and operating mechanism common to said fastening devices adapted, in one operation, to move the fastening devices into engagement with the demountable rim, and, in another operation, adapted to operate said fastening devices to disengage the same from the demountable rim.

In witness whereof, I hereunto subscribe my name this 27th day of October A. D. 1908.

GUY C. GRABLE.

Witnesses:
G. L. CROGG.
L. G. STROH.